(12) United States Patent
Rudi (10) Patent No.: US 6,297,927 B1
(45) Date of Patent: Oct. 2, 2001

(54) MULTIPLE TAPE CARTRIDGE AND DRIVE SYSTEM WHEREIN TAPES ARE EXTRACTED FROM THE CARTRIDGE

(75) Inventor: Guttorm Rudi, Fjelhamar (NO)

(73) Assignee: Tandberg Data ASA, Oslo (NO)

( * ) Notice: Subject to any disclaimer, the term of this patent is extended or adjusted under 35 U.S.C. 154(b) by 0 days.

(21) Appl. No.: 09/006,459

(22) Filed: Jan. 13, 1998

(51) Int. Cl.[7] ............................. G11B 5/008; G11B 23/02
(52) U.S. Cl. ............................................. 360/95; 360/132
(58) Field of Search .................. 360/95, 132; 242/332.1, 242/332.4

(56) References Cited

U.S. PATENT DOCUMENTS

| | | | | |
|---|---|---|---|---|
| 4,617,719 | * | 10/1986 | Woodley | 360/95 |
| 5,202,809 | * | 4/1993 | Dodt et al. | 360/95 |
| 5,219,129 | * | 6/1993 | Spicer et al. | 360/95 |
| 5,253,246 | * | 10/1993 | Leonhardt et al. | 360/92 |
| 5,293,285 | * | 3/1994 | Leonhardt et al. | 360/95 |
| 5,433,395 | * | 7/1995 | Turgeon et al. | 360/132 |

* cited by examiner

*Primary Examiner*—David D. Davis
(74) *Attorney, Agent, or Firm*—Schiff Hardin & Waite (57) ABSTRACT

In a drive system and a magnetic tape cartridge for use therewith, the magnetic tape cartridge contains a number of magnetic tapes, and the drive system contains at least a like number of read/write heads. The drive system includes a mechanism which is engageable with all of the magnetic tapes in the cartridge for simultaneously extracting all of the magnetic tapes from the cartridge and moving all of the magnetic tapes so that each tape engages with at least one of the read/write heads. Data can then be simultaneously transferred between the engaged tapes and read/write heads, so that the time needed to access data in a read mode, and the time needed to write data in a record mode, are correspondingly reduced by a multiple which is dependent on the number of tapes. All of the tapes are wound onto a single take-up reel.

17 Claims, 7 Drawing Sheets

MULTIPLE TAPE CARTRIDGE AND DRIVE SYSTEM WHEREIN TAPES ARE EXTRACTED FROM THE CARTRIDGE

BACKGROUND OF THE INVENTION

1. Field of the Invention

The present invention relates to information storage and to information storage on magnetic tapes and in particular to a magnetic tape cartridge and a drive therefor.

2. Description of the Prior Art

The need for storing all types of information in a digital form is increasing very rapidly. Such information can be any kind of computer based/generated data, data generated by document scanners, loggers, various forms of video or audio information, or a combination of any of these.

Tape is by far the cheapest high capacity media available today, and the suppliers of tape drives are constantly bringing out new drives with better performance (higher capacity, shorter access time, higher data rates, etc.).

Originally, tape drives were based upon the open-reel principle: The tape to be recorded was supplied on one reel which was mounted on the tape drive by the operator. The tape was then guided from the supply reel across the recording head to an empty take-up reel. As the tape drive was running, more and more tape was moved from the supply reel to the take-up reel. At the end, the tape was rewound from the take-up reel back on to the supply reel. Then the operator could remove the supply reel and replace it with another one.

This system is still in use in some data systems today. The requirement for a trained operator, the size of the supply reel (normally 10 inches or more in diameter), and no protection of the tape when the supply reel is removed from the tape drive, make such open reel systems less attractive today.

There are many tape cassette/cartridges in use today; however, they can typically be categorized into three basic groups: single reel cassette, dual reel cassette, and belt driven cassette or cartridge.

The single reel cassette is really a refined version of the original open-reel system. Well known examples of the single reel cassette, are the IBM 3480 (later enhanced into 3490 and newer models) and the DLT cassette (previously known as the Compact cassette). These cassettes are characterized by a square (normally quadratic or close to quadratic) housing containing a single tape hub (with tape). During operation, the cassette is inserted in the drive and one end of the tape is automatically pulled out of the cassette and onto a take-up reel inside the drive. The operation therefore resembles the old open reel system, except that the tape cassette is physically smaller, and designed so that loading and tape extraction can be done without operator involvement. These cassettes have an opening on one side of the housing to allow the tape end to be pulled out during insertion into the tape drive. At the bottom of the cassette house is an opening which allows a drive motor built into the tape drive to engage to the tape reel in the cassette.

These single reel cassettes have increased in popularity during the last few 10 years, because they offer relatively large tape length in a fairly small cassette housing. Also, the cost of building tape drives which can handle such cassettes effectively and reliably has decreased considerably.

Nevertheless, single reel tape cassettes have some basic drawbacks The most important one is that the tape always must be pulled out of the cassette onto the take-up reel inside the drive. This requires a fairly sophisticated mechanism, and it takes time. Many single reel cassette systems need between 20 and 60 seconds or more just to load the tape properly. This will significantly reduce the effective speed of the system (longer data access time).

Furthermore, if power is lost during operation, it is normally impossible to eject the cassette from the tape drive. For some applications and systems, this may be a severe drawback.

The dual reel cassette is well known in many different versions: 4 mm DAT or DDS cassette, 8 mm videocassette, the Philips audio (Compact) cassette and the VHS video cassette just to name a few.

The principle of the dual reel cassette is that both tape reels are located within the cassette housing. The tape moves from one reel to the other during operation. A portion of the tape housing is typically designed to be opened when the cassette is inserted into the tape drive, thereby exposing the tape itself. The read/write head of the drive, tape capstan spindle(s) and drive tape guides can then get into contact with the tape. In some cases, like the VHS, the 8 mm and the 4 mm cassettes, a section of the tape is actually pulled out of the cassette during insertion into the drive and is wrapped around the recording heads and over the drive tape guides.

Compared to the single reel cassette design, the dual reel cassette normally allows a fairly simple drive mechanism to be used, especially if the tape does not need to be partly pulled out of the cassette. Dual reel cassettes have two openings at the bottom where tape drive motors can engage the tape reels inside the cassette.

A drawback with dual reel cassettes is that there must be room for more than two full tape reels inside the housing. First of all, the distance from each hub to the inside of the cassette housing must be at a minimum equal to the maximum radius of a hub fully loaded with tape (plus a small tolerance/safety figure). Secondly, the distance between the hubs is a function of the diameter of a hub fully loaded with tape. It can be shown that the maximum distance required between the two hubs occurs when both hubs contain equal amount of tape (=half the tape length).

By definition, within the same form factor, the dual reel cassette thus has a capacity for less tape medium than a similar single reel cassette with the same form factor.

During the last years, the dual reel cassette has gained a lot of popularity, especially because the mechanical design of the tape drive can be made far simpler and more reliable than for drives utilizing single reel cassettes. The fact that the available total length within a given form factor is typically 60 to 70% less than for a comparable single reel cassette, however, has hampered its acceptance in high end professional systems focusing on maximum capacity.

The belt driven cassette is a variant of the dual reel cassette. The most widely used version is the QIC (quarter inch cartridge) and its smaller companion, the Travan cartridge. In this type of cassette a belt engages the tape by friction. When the drive motor moves the belt this will move the tape.

Compared to a dual reel cassette, the belt driven QIC cartridge is designed so that only one capstan motor is necessary for driving the cartridge reels at one point. That can simplify the drive construction even further. Like the dual reel cassette, however, the belt driven QIC cartridge has the same limitations with respect to available tape length as the dual reel cassette. Actually, because the belt driven cartridge typically needs to have some additional components (belt guides etc.) inside its housing, the available tape length may be less than for a similar dual reel cassette design.

All these alternatives have a transfer rate which is limited, among other features, by the drive system's rotation velocity. The time to access specific data is limited as well in the known alternatives by the fact that segments of the tape can only be read sequentially (one after the other) from one end of the tape to the other.

These problems do not limit the use of magnetic tape for data storage in relation to backup systems, but they gain importance in relation to library systems where information must be recorded and accessed at high rates, and in relation to video systems.

SUMMARY OF THE INVENTION

It is an object of the present invention to provide a cartridge and drive system wherein time to data and transfer rate are highly improved.

This object is inventively achieved by a multi-tape drive system for information recording/reading on/from a cartridge containing at least a first tape supply reel and a second tape supply reel, the drive being equipped with a mechanism for simultaneously extracting two tapes from both supply reels, and heads for data reading/recording on both tapes simultaneously, so that the system's reading/recording speed is doubled (double transfer rate, halved time to data), and an arrangement for winding both first and second tapes on a common take-up reel.

In a first embodiment of the invention, the drive system has a leader block arm engaging a leader block that constitutes a part of the cartridge, and that is permanently attached to the magnetic tapes. In this case some of the mechanical features of the combination drive system/tape cartridge are placed in the cartridge. This cartridge is itself inventive, having two different tapes, one in each reel, mechanically joined together by the leader block. The cartridge complements and is specially designed for use with the drive system according to the fist embodiment of the invention.

In a second embodiment, the tape drive system has a leader block that is attached to the tapes only while the tapes are in use. This embodiment of the drive system will be used in connection with tape cartridges that are very simple in construction, because no special mechanical features are required for the cartridge. The tape cartridge contains two segments of tape permanently joined together, preferably two lengths of the same tape. The tape will be guided externally toward the recording heads and the take-up reel, making guide elements for position adjustments in the cartridge unnecessary. The cartridge itself is thus also part of this embodiment of the invention.

The system according to the invention has the advantage that the recording/access rate is doubled, that is, the time to data is reduced by half and the transfer rate is doubled. The transfer rate is doubled because two tapes (first and the second tape) are recorded at the same time (in parallel) by two recording heads. The time to data is halved because the data is accessed in parallel as well.

The invention relates as well as stated before, to a multi-tape cartridge for use in a tape drive system for information recording/reading on/from magnetic tape, the cartridge containing a first supply reel carrying a first tape, the first tape being extracted from the cartridge for transferring the first tape to a take-up reel in the tape drive system for information reading/recording. The cartridge also contains at least a second supply reel carrying a second tape that is attached to the first tape, the attached second tape also being extracted of the cartridge together with the first tape for transferring the second tape to the take-up reel for reading/recording information at the same time from/on both of the first and second tapes.

In one embodiment of the invention the first and second tapes are joined together by means of a leader block.

This embodiment of the cartridge according to the invention is designed for use together with the drive system embodiment described before, having a leader block arm that moves the cartridge's leader block from a position inside the cartridge to a position near the center of the drive system's take-up reel. The cartridge's leader block is equipped with a bridge for joining said two tapes and structure adapted for cooperation with the leader block arm, and structure adapted for cooperation with retainer at said take-up reel.

In another embodiment of the invention the first and second tapes are continuously attached to each other, that is, without a physical transition. In a preferred embodiment the first and second tape are respective lengths of one and the same tape.

This embodiment of the cartridge according to the invention is to be used in relation with the above-described second embodiment of the drive system of the invention wherein the arrangement for taking the first and second tapes out of the cartridge is part of the drive system.

The cartridges according to the invention can have the same outer dimensions as a standard dual reel cartridge, and can house two full tape reels. They are adapted to permit extraction of tape from both supply reels at the same time.

The system according to the invention is simple and reliable, and it can be implemented with parts that already are in the market. The drive system is robust.

The system makes it simple to thread the tape and to direct it toward the take-up reel. This feature leads to shorter time to data, because complicated threading procedures are avoided. Short time to data is specially important in relation to library systems.

The system leads to high data transfer rates and low time to data with low form factor. To get the same transfer rate and time to data in a system based on the known tape types (that is, a system where tape is taken out of one reel at a time) as with the system according to the invention, it would be necessary to increase the tape's width. This would lead to high form factor cartridges, that have several disadvantages.

Wide tapes suffer high temperature expansion in the cross section, this leads to imprecision and again to longer time to data/lower transfer rate.

When the tape is rewound, an air cushion is created between the tape layers, this cushion limits the rewinding speed, and because a wide tape has a bigger contact surface it must be rewound at a lower speed than a narrow tape, to avoid formation of an air cushion.

As it will be apparent from the following detailed description, the invention has several special features related to the first and second embodiments, that make it particularly suitable for use and that lead to a very cost favorable product.

Although the invention is illustrated by means of examples wherein the system includes two supply reels and one take-up reel, it is not limited thereto. It is clear that the system's transfer rate and time to data will improve in proportion to $2^n$, where n is the number of supply reels in the system. Several supply reels can, for example, be arranged side by side in the cartridge, and the cartridge's height would be kept low. In all embodiments, each supply reel has one tape uniquely allocated thereto, meaning that the tape uniquely allocated to particular supply reel is never wound onto another supply reel in the cartridge (even when two "tapes" are respective portions of a single, continuous tape).

DESCRIPTION OF THE PREFERRED EMBODIMENTS

Figure 1:
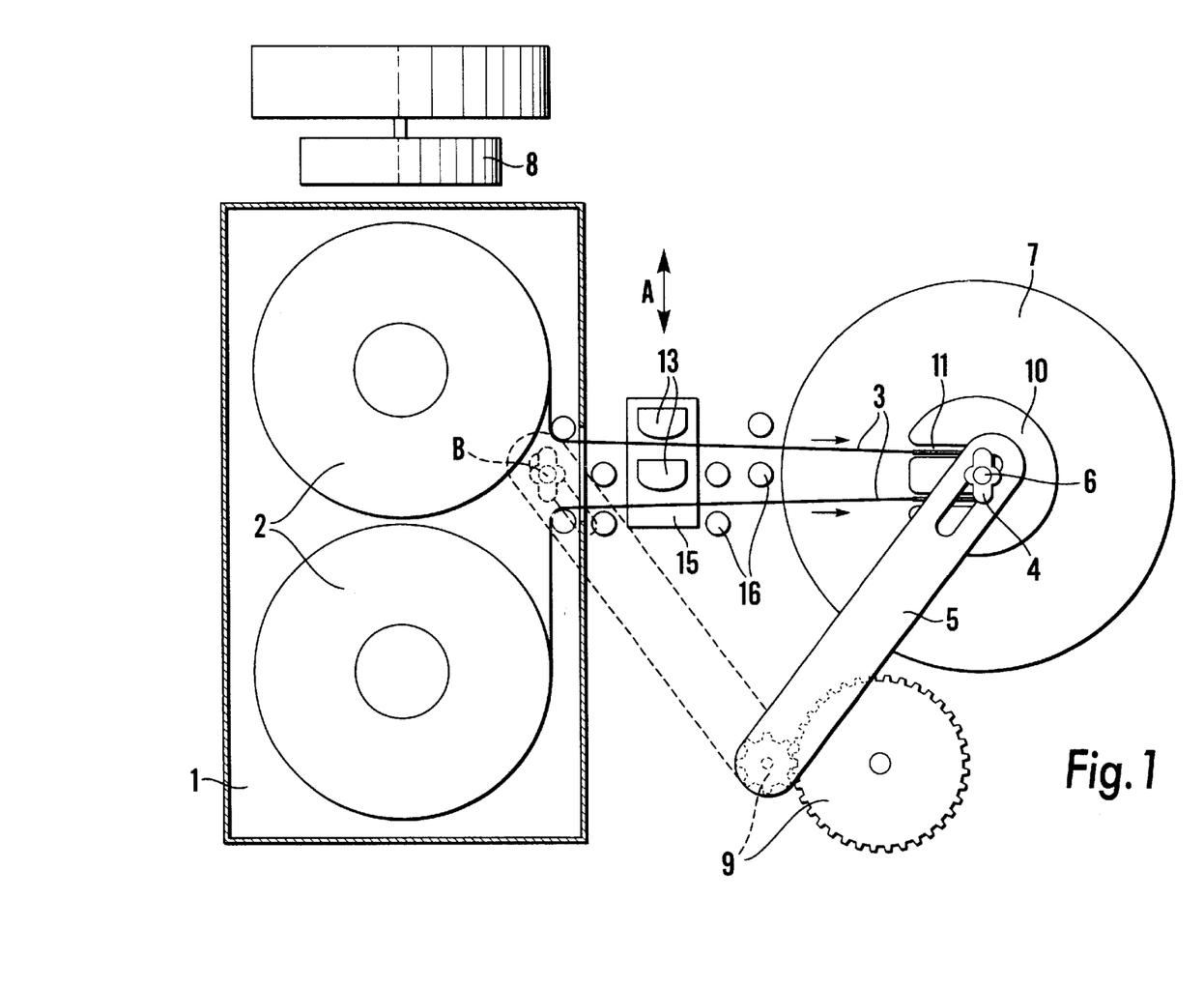
FIG. 1 is a plan view of a first embodiment of the invention.
Figure 2:
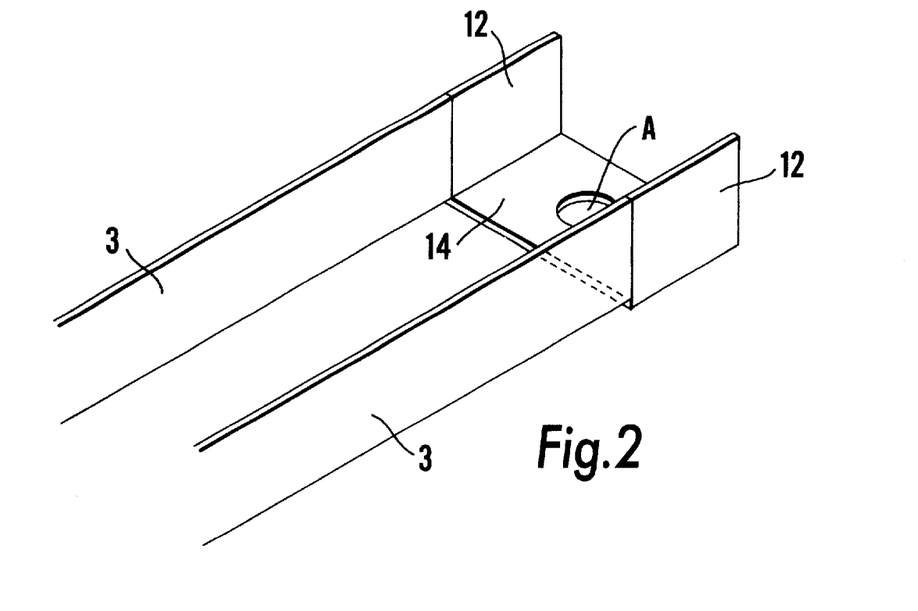
FIG. 2 shows a leader block in greater detail.

FIG. 1 shows a first embodiment of the drive system according to the invention, together with a first embodiment of a tape cartridge according to the invention. In this figure, a cartridge 1 containing a first and second supply reels 2 is shown. The first and second supply reels 2 each carry a magnetic tape 3. The supply reels 2 are placed in the drive and are automatically connected to spindles, that rotate the reels 2 by means of motors 8. The outer end of each magnetic tape is attached to a common leader block 4. The leader block 4 is shown in greater detail in FIG. 2. The leader block 4 in this embodiment has two ribs 12 for attachment to the respective outer ends of the first and second tapes 3, and a bridge 14 that joins the two ribs 12. On the bridge 14 there is provided connecting structure A (FIG. 2) for engagement with corresponding structure B in a leader block arm 5. The leader block 4 is engaged and moved by means of the leader block arm 5 from a first position, where the leader block 4 is contained in the housing of the cartridge 1, to a second position where it is in contact with take-up reel 7. The leader block arm 5 is moved by means of load and leader block cog wheels 9a and 9b. When the leader block 4 and consequently the ends of the first and second tapes 3 reach the periphery 10 of the take-up reel 7, they meet receiving and guiding structure in the form of grooves 11 in the hub of the take-up reel 7, that engage the ribs 12 and guide the leader block 4 to it's final operating position adjacent the center 6 of the take-up reel 7. As the leader block arm 5 engages the tapes 1 and 2 with the take-up reel 7, the tapes 1 and 2 are also respectively brought into engagement with magnetic heads 13. As noted elsewhere, the present invention is not restricted to the two tape embodiment described herein for exemplary purposes; more than two tapes can be contained within the tape cartridge and in general when the tapes are extracted from the cartridge by the leader block arm 5, each tape will engage at least one magnetic head 13 and data will be written on only one side of each tape. If space and cost permit, more than one magnetic head 13 can be arranged in succession to engage each tape, for example, one magnetic head 13 for recording data and another magnetic head 13 for reading data. As used herein, the term "engage" in the context of a tape and a head means that the tape and the magnetic head are brought into sufficiently close proximity with each other to enable magnetic interaction between the tape and the head so as to allow for data transfer between the tape and the head.

The system according to the invention has at least two magnetic heads 13 for data recording/reading (generically referred to as "data transfer"), with one magnetic head 13 performing data recording/reading on each magnetic tape 3. The magnetic heads 13 are placed on a common head carriage 15. Two different embodiments of the head carriage are respectively shown in FIGS. 1, 3 and 5 and will be explained in relation with two embodiments of the drive system according to the invention. It is clear that any embodiment of the head carriage can be used with any embodiment of the drive system.

In a first embodiment of the head carriage (FIGS. 1,3), the head carriage 15, is formed by a block for individual support of the magnetic heads 13. The carriage can move in a track adjusting direction and in a tape loading/withdrawal direction. The track adjusting direction is parallel to the take-up reel 7 axis, and movement of the common head carriage 15 and thus of the magnetic heads 13 permits adjustment of the recording/reading track (the magnetic tape 3 (as is known) has several recording/reading tracks that can be reached by movement in this direction). In the first embodiment of the head carriage (FIG. 1), the magnetic heads 13 can be moved independently to obtain a more precise track adjusting. The tape loading/withdrawal direction is perpendicular to the direction and to the direction of the movement of the tape 3 when passing the magnetic heads 13 (arrow A in FIG. 1). This movement permits withdrawal of the common head carriage 15 and thus the magnetic heads 13 from the tapes 3 during tape loading/rewinding. In this way the magnetic heads 13 are not exposed to unnecessary contact with the tape 3 and this results in improvement of tape working time.

The drive system is provided with tape guides 16 for guiding the tapes 3 between the supply reels 2 and the take-up reel 7. This reduces contamination and wear on the working faces of the tapes 3.

Figure 3:
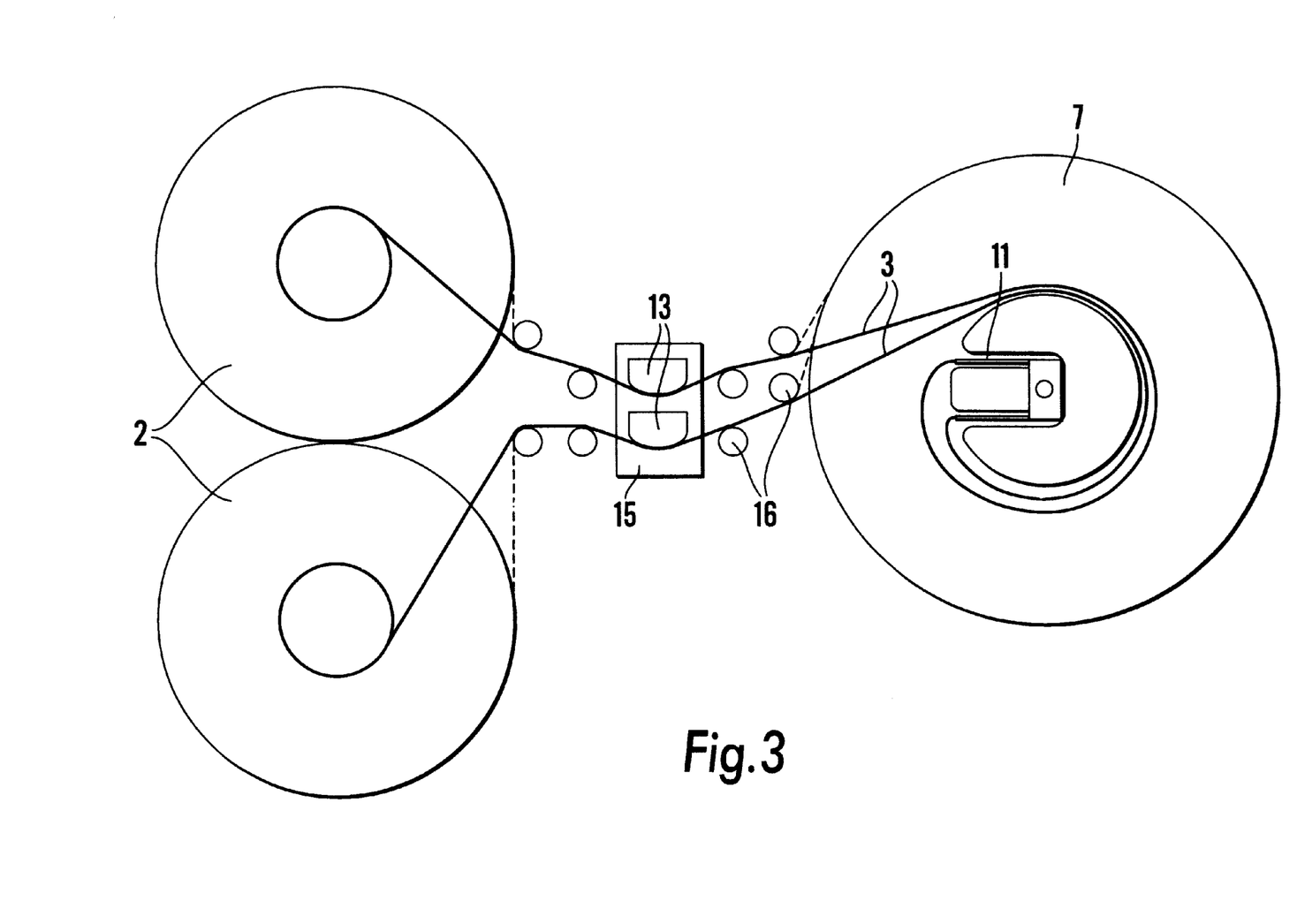
FIG. 3 shows the first embodiment of the invention with the first and second tapes partially wound round the take-up reel.

FIG. 3 shows the embodiment of FIG. 1 with the first and second tapes 3 partially wound round the take-up reel 7. The leader block 4 is totally introduced in the hub of the take-up reel and the ends of ribs 12, facing the tapes, are flush with the hub's periphery. In FIG. 3 it can be seen that both tapes 3 are wrapped together around the hub of the take-up reel 7. It is important to note that the active (i.e., data-carrying) sides of the tapes 3 are not in mutual contact. In this way it is possible to avoid undesirable influence of the magnetization state of the tape on the magnetization sate of the other tape.

Figure 4:
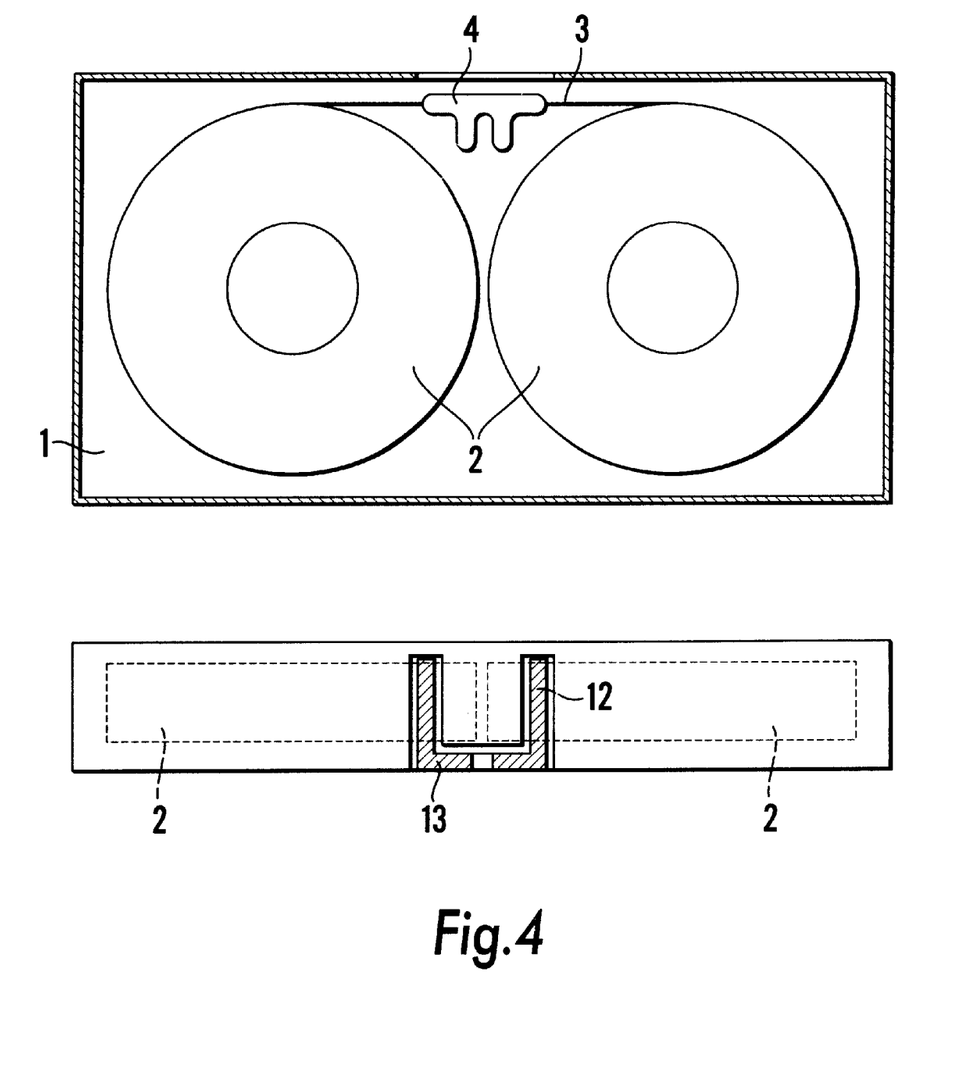
FIG. 4 shows a tape cartridge according to the invention.

FIG. 4 shows a first embodiment of a tape cartridge according to the invention. The cartridge has housing 1, first and second supply reels 2 for magnetic tape, and a leader block 4, The characteristics of this tape cartridge have already been discussed in relation to FIGS. 1, 2 and 3

Figure 5:
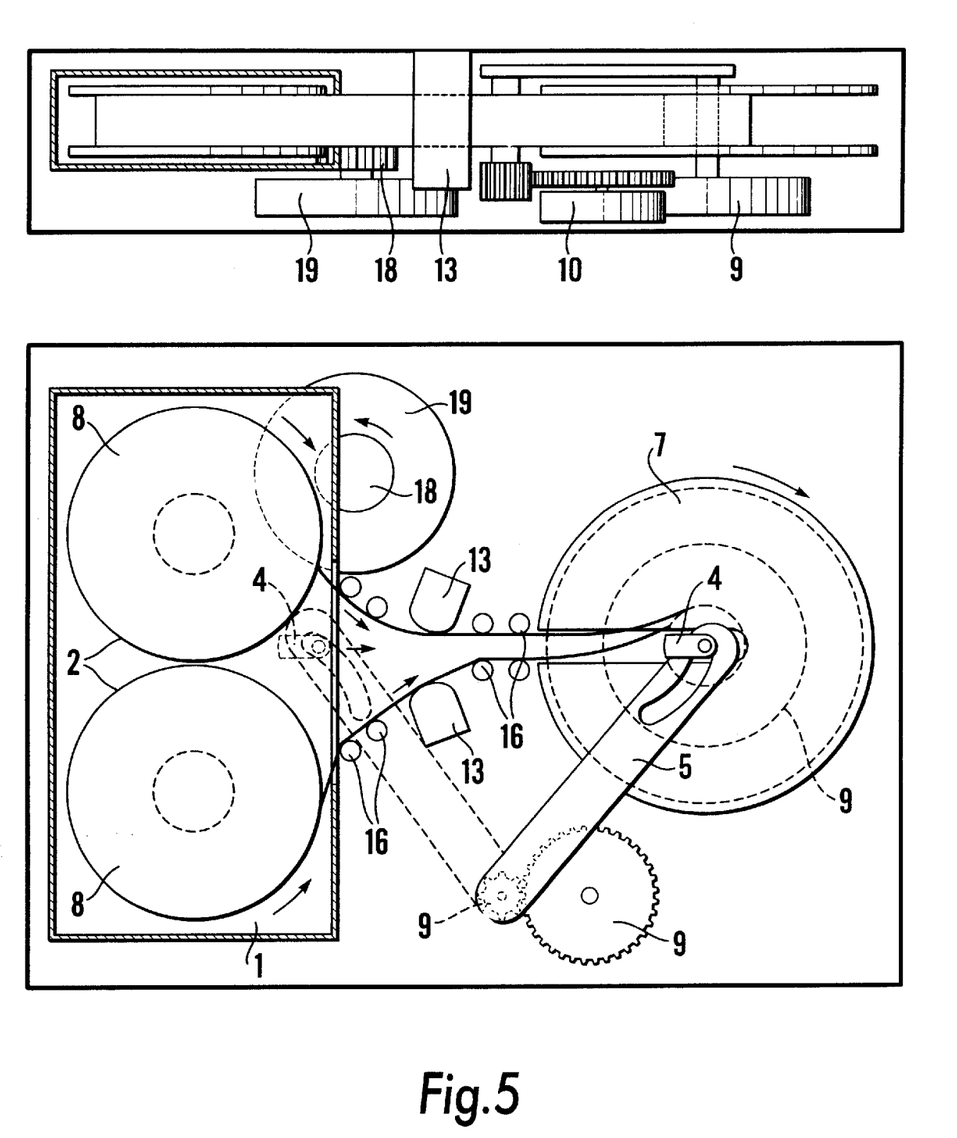
FIG. 5 shows a second embodiment of the invention.
Figure 6:
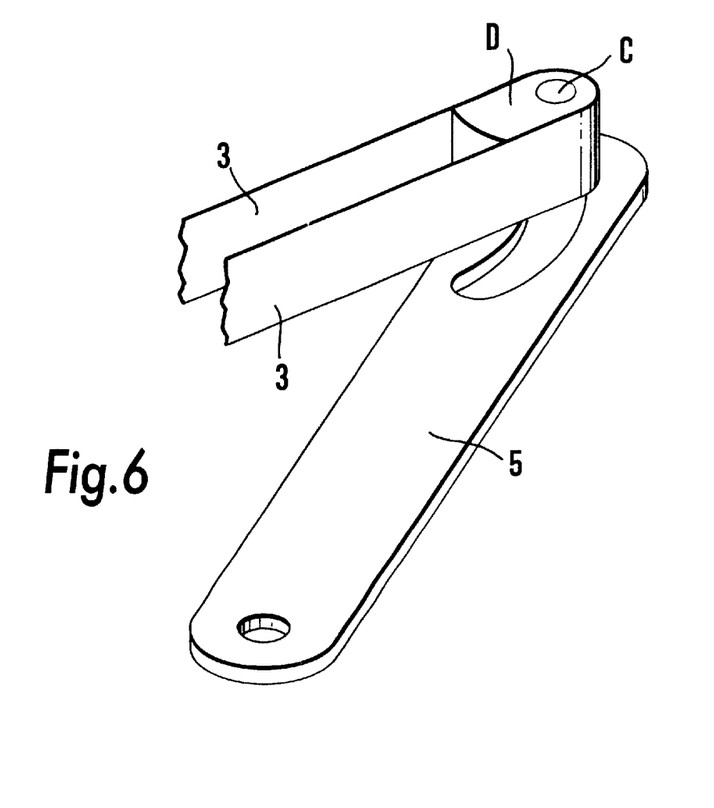
FIG. 6 shows a leader block arm for use in relation with the embodiment shown in FIG. 5.

FIG. 5 shows a second embodiment of a tape cartridge and a drive system according to the invention. In this second embodiment, the first and second tapes 3 are continuously attached to each other, that is they are parts of one and the same tape 3. In this embodiment, the leader block 4 is part of the drive system. The leader block 4 (FIG. 6) in this embodiment consists of a gripping mechanism C that grabs the tape 3 and moves it toward the take-up reel 7 and an element D for cooperation with receiving structure in the form of a radial slot in the take-up reel hub.

The cartridge 1 (FIG. 5) according to this embodiment of the invention consists only of a housing and two supply reels 2 for magnetic tape 3. The supply reels are rotated by means of a hub drive cogwheel 18 and cogwheel motor 19. The magnetic heads 13 are placed in a common head carriage. The leader block arm is moved by cog wheels 9a and 9b, and the take-up reel is rotated by a further cog wheel 7, FIG. 5 shows an embodiment of the magnetic head carriage, where the magnetic heads are joined together by a bridge portion. This embodiment permits track adjusting movement of the common head carriage as discussed in connection with the first embodiment of the invention, but it does not permit withdrawal movement, nor individual movement of the magnetic heads 13.

The tape guides 16 are placed on the side of the tape 3 facing the magnetic heads 13.

In this embodiment, the active surfaces of the tapes 3 are in contact with each 15 other when the tape is wrapped around the hub of the take-up reel 7.

When the tape 3 is to be returned to the cartridge 1, the reels 2 can briefly be operated in reverse to wind the tape 3 onto the reels 2 as the leader block arm 5 moves back toward the cartridge 1.

Figure 7:
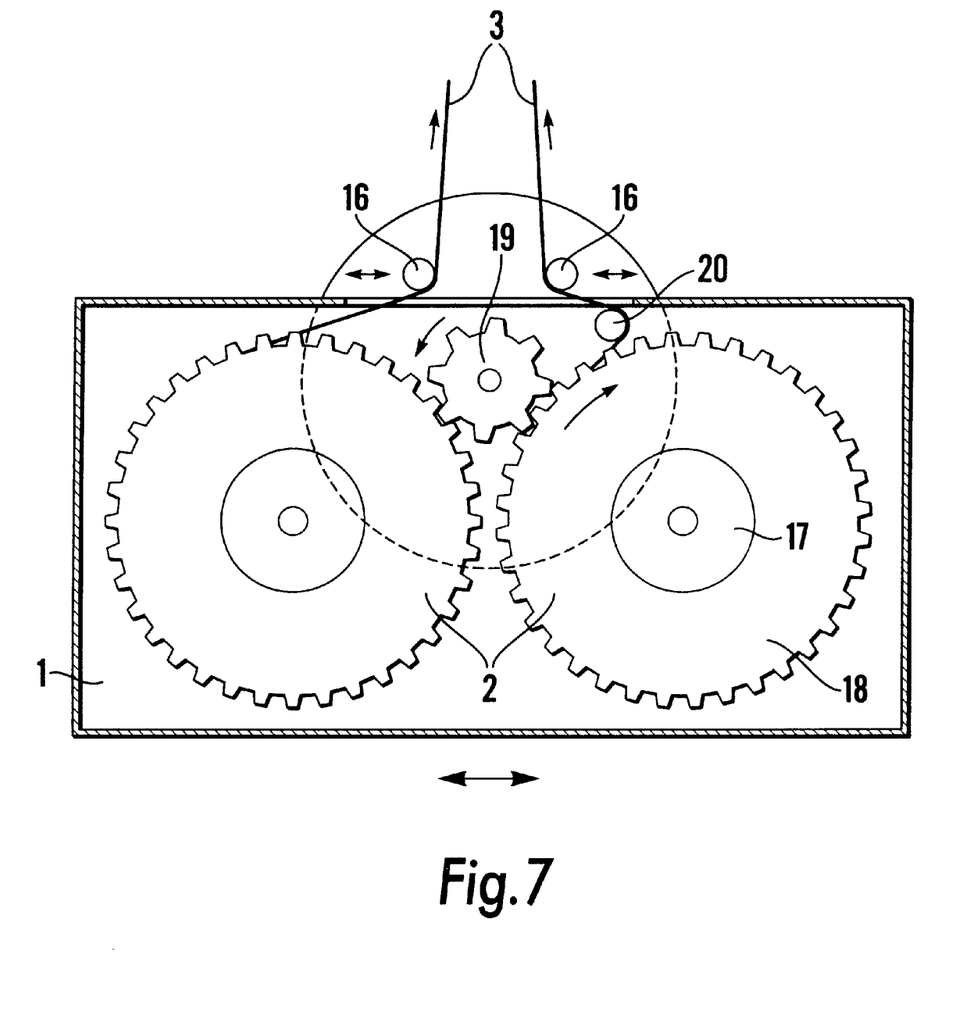
FIG. 7 shows a view of a first alternative drive arrangement for a multi-tape cartridge in accordance with the invention.
Figure 8:
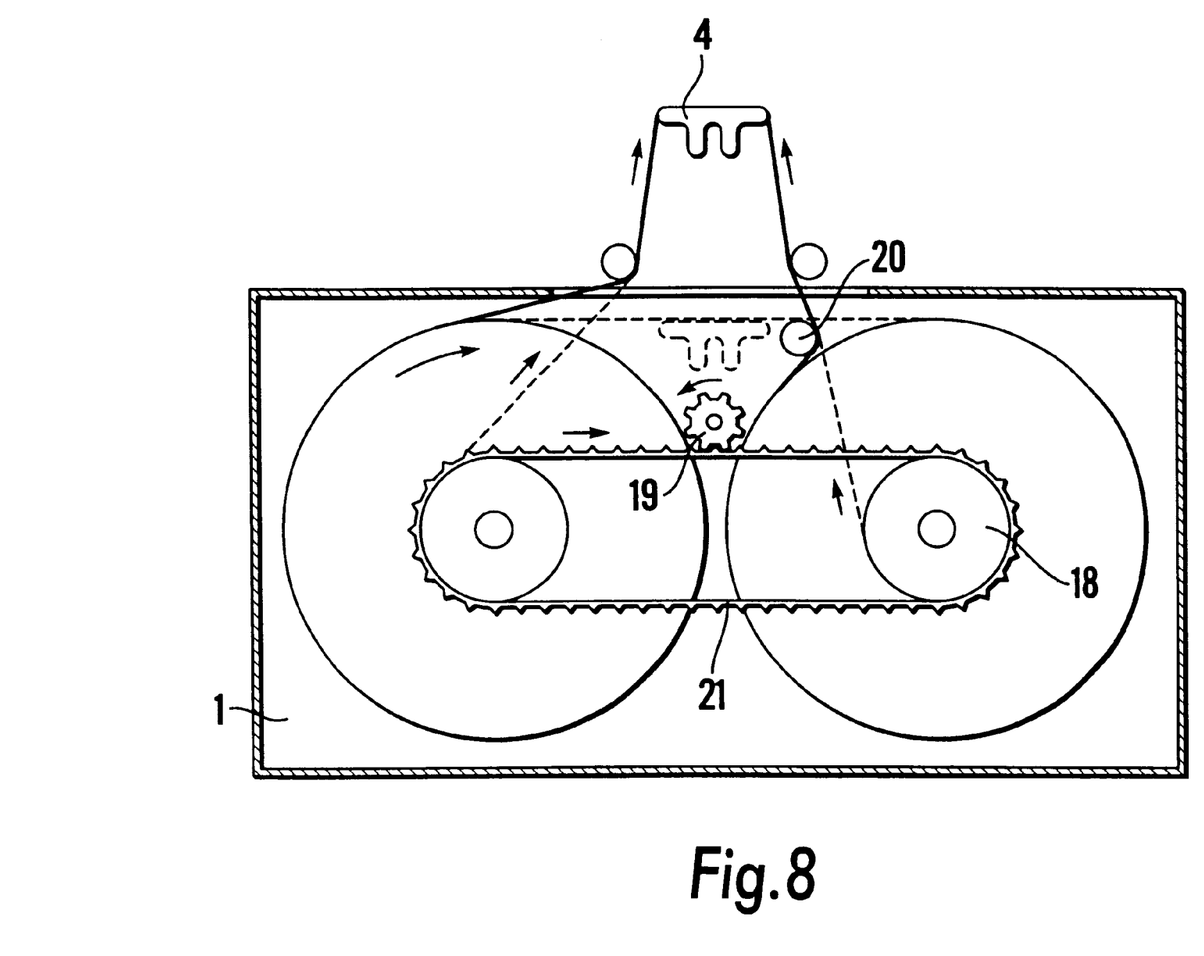
FIG. 8 shows a second alternative drive arrangement for a multi-tape cartridge in accordance with the invention.

FIG. 8 shows a view from below of a first version of a drive arrangement for rotating the reels 2 for the tape or tapes 3 in the multi-tape system of the invention. In this embodiment, the reels 2 each have cog wheels 18 connected to their hubs 17, and a smaller cog wheel 19 is disposed between the cog wheels 18. The cog wheel 19 is rotated by a motor. When the cog wheel 19 is rotated in the direction indicated by the adjacent arrow, the cog wheels 18 will be rotated in the directions indicated by the arrows contained in the respective cog wheels 18. Since the tape 3 is entrained around the roller 16, it will be unwound from the left reel 2 (as seen in FIG. 7) in the direction indicated by the arrow adjacent the tape 3 exiting from the left. By virtue of the "extra" guide roller 20, the tape 3 is also unwound from the right reel 2 (as seen in FIG. 7) so that it also proceeds in the direction of the arrow adjacent the right-exiting tape 3 in FIG. 7.

In the further version shown in FIG. 8, a toothed belt 21 is entrained around the hubs 18 of the two reels 2, and this toothed belt is driven by rotation of the cog wheel 19, in the direction of the arrow adjacent the belt 19. The reels 2 are again caused to rotate in the respective directions as indicated by the internal arrows, and the tapes 3 with the leader block 4 connected therebetween, exit the housing of the cartridge 1 in the directions indicated by the adjacent arrows.

As is apparent from the foregoing description, the invention is susceptible of being embodied with various alterations and modifications which may differ particularly from those that have been explicitly described herein. It is the intention of the inventor to embody within the scope of the patent warranted hereon all such modifications as reasonably and properly come within the scope of his contribution to the art.

I claim as my invention:

1. A magnetic transfer system comprising:
    a magnetic tape cartridge containing a plurality of magnetic tapes;
    a plurality of magnetic data transfer heads;
    a single take-up reel having hub means for mechanically retaining all of said plurality of magnetic tapes for winding all of said plurality of magnetic tapes on said single take-up reel, and for subsequently unwinding all of said tapes from said single take-up reel; and
    load/unload means for, in a load operation, engaging said plurality of magnetic tapes in said cartridge for simultaneously extracting said plurality of magnetic tapes from said cartridge and for placing said tapes respectively into engagement with at least one of said heads in said plurality of magnetic data transfer heads for simultaneously transferring data between respective single sides said tapes and the respective heads and for bringing all of said plurality of magnetic tapes into mechanical engagement with said hub means for winding all of said plurality of magnetic tapes on said take-up reel with the respective single sides of said magnetic tapes out of contact with each other, and, in an unload operation after all of said magnetic tapes are unwound from said take-up reel, for releasing said magnetic tapes from said hub means and for returning all of said magnetic tapes to said cartridge.

2. A magnetic data transfer system as claimed in claim 1 wherein said load/unload means comprises:
    an arm having a first end engageable with all of said magnetic tapes in said plurality of magnetic tapes while said plurality of magnetic tapes are in said cartridge, and having a second end; and
    means drivingly engaged with said second end of said arm for arcuately moving said arm to extract said tapes from said cartridge, for moving said tapes respectively past said plurality of magnetic data transfer heads, in a direction toward said take-up reel in said load operation and for moving said tapes in an opposite direction away from said take-up reel during said unload operation.

3. A magnetic data transfer system as claimed in claim 2 wherein said take-up reel has a take-up reel axis around which said take-up reel rotates to wind said plurality of magnetic tapes thereon, and wherein said means for arcuately moving said arm comprises drive motor means for rotating said arm around an arm axis disposed at said second end of said arm and disposed parallel to said take-up reel axis.

4. A magnetic data transfer system as claimed in claim 3 wherein said drive motor means comprises a motor and at least one cogwheel engaging said motor with said second end of said arm.

5. A magnetic data transfer system as claimed in claim 1 wherein said plurality of magnetic data transfer heads is equal in number to said plurality of magnetic tapes.

6. A magnetic data transfer system as claimed in claim 1 wherein said plurality of magnetic data transfer heads is equal to twice said plurality of magnetic tapes, and wherein said load/unload means comprises means for moving each of said magnetic tapes respectively into engagement with two of said magnetic data transfer heads.

7. A magnetic data transfer system as claimed in claim 1 further comprising a head carriage on which said plurality of magnetic data transfer heads are mounted in common.

8. A magnetic data transfer system as claimed in claim 7 further comprising means for adjusting a position of said head carriage for simultaneously adjusting respective positions of said magnetic data transfer heads.

9. A magnetic data transfer system as claimed in claim 8 wherein said takeup reel has a take-up reel axis around which said take-up reel rotates to wind said plurality of magnetic tapes thereon, and wherein said means for adjusting a position of said head carriage comprises means for moving said head carriage in directions parallel to said take-up reel axis.

10. A magnetic data transfer system as claimed in claim 8 wherein said takeup reel has a take-up reel axis around which said take-up reel rotates to wind said plurality of magnetic tapes thereon, and wherein said means for adjusting a position of said head carriage comprises means for moving said head carriage along directions perpendicular to said take-up reel axis and perpendicular to said plurality of magnetic tapes.

11. A magnetic data transfer system as claimed in claim 10 wherein said means for adjusting a position of said head carriage comprises means for moving said plurality of magnetic data transfer heads on said head carriage respectively toward said plurality of magnetic tapes during said load operation and for moving said plurality of magnetic data transfer heads on said carriage respectively away from said plurality of magnetic tapes during said unload operation.

12. A magnetic data transfer system as claimed in claim 1 wherein said takeup reel has a take-up reel axis around which said take-up reel rotates to wind said plurality of magnetic tapes thereon, and said drive system further comprising means for individually adjusting a position of each magnetic tape in said plurality of magnetic tapes relative to a respective magnetic data transfer head in said plurality of magnetic data transfer heads, along directions perpendicular to said take-up reel axis and perpendicular to said plurality of magnetic tapes.

13. A drive system as claimed in claim 1 wherein said take-up reel has a take-up reel axis around which said take-up reel rotates to wind said plurality of magnetic tapes thereon, and said drive system further comprising means for individually adjusting a position of each magnetic tape in said plurality of magnetic tapes relative to a respective magnetic data transfer head in said plurality of magnetic data transfer heads, along directions parallel to said take-up reel axis.

14. A magnetic data transfer system as claimed in claim 1 wherein each tape in said plurality of magnetic tapes has a blank side and a data carrying side, and wherein said load/unload means comprises means for bringing said plurality of magnetic tapes into mechanical engagement with said hub means with the data carrying side of each of said magnetic tapes facing the blank side of an adjacent one of said magnetic tapes.

15. A magnetic tape cartridge comprising:

a housing;

a plurality of rotatable hubs in said housing;

a plurality of magnetic tapes respectively wound on said hubs, said plurality of magnetic tapes being respectively uniquely allocated to said hubs so that no tape allocated to a hub is ever wound onto another of said hubs in said housing;

said housing having an opening therein disposed relative to said hubs and said tapes so that all of said tapes are simultaneously extractable from said housing in common through said opening; and a leader block to which all of said magnetic tapes in said plurality of magnetic tapes are connected, said leader block being extractable through said opening together with said magnetic tapes.

16. A magnetic transfer system comprising:

a magnetic tape cartridge having a housing containing a first hub on which a first magnetic tape is wound and a second hub on which a second magnetic tape is wound;

a leader block contained in said housing to which said first and second tapes are attached, said housing having an opening therein through which said leader block can pass;

a plurality of magnetic data transfer heads;

a single take-up reel having hub means for mechanically retaining said leader block for winding said first and second magnetic tapes on said single take-up reel, and for subsequently unwinding said first and second magnetic tapes from said single take-up reel; and load/unload means for, in a load operation, engaging said leader block in said housing and removing said leader block from said housing through said opening for simultaneously extracting said first and second magnetic tapes from said cartridge and for placing said first and second magnetic tapes respectively into engagement with at least one of said heads in said plurality of magnetic data transfer heads for simultaneously transferring data between said first and second magnetic tapes and the respective heads and for bringing said leader block into mechanical engagement with said hub means, and, in an unload operation after said first and second magnetic tapes are unwound from said take-up reel, for releasing said leader block from said hub means and for returning said leader block and said first and second magnetic tapes to said cartridge.

17. A magnetic transfer system comprising:

a magnetic tape cartridge having a housing containing a first hub on which a first magnetic tape is wound and a second hub on which a second magnetic tape is wound;

a leader block;

a plurality of magnetic data transfer heads;

a single take-up reel having hub means for mechanically retaining said leader block for winding said first and second magnetic tapes on said single take-up reel, and for subsequently unwinding said first and second magnetic tapes from said single take-up reel; and load/unload means to which said leader block is attached for, in a load operation, engaging said first and second magnetic tapes in said housing with said leader block for simultaneously extracting said first and second magnetic tapes from said cartridge and for placing said first and second magnetic tapes respectively into engagement with at least one of said heads in said plurality of magnetic data transfer heads for simultaneously transferring data between said first and second magnetic tapes and the respective heads and for bringing said leader block into mechanical engagement with said hub means, and, in an unload operation after said first and second magnetic tapes are unwound from said take-up reel, for releasing said leader block from said hub means and for returning said first and second magnetic tapes to said housing and disengaging said first and second magnetic tapes from said leader block.

* * * * *